(12) United States Patent
Pallapothu

(10) Patent No.: US 6,768,058 B2
(45) Date of Patent: Jul. 27, 2004

(54) SELF-SEALING GROMMET ASSEMBLY

(75) Inventor: Hari S. Pallapothu, Fontana, CA (US)

(73) Assignee: Kirkhill-TA Co., Brea, CA (US)

( * ) Notice: Subject to any disclaimer, the term of this patent is extended or adjusted under 35 U.S.C. 154(b) by 0 days.

(21) Appl. No.: 10/065,234

(22) Filed: Sep. 26, 2002

(65) Prior Publication Data

US 2004/0060723 A1 Apr. 1, 2004

(51) Int. Cl.$^7$ .................................................. H02G 3/18
(52) U.S. Cl. ................ 174/65 G; 174/151; 174/153 G; 174/135; 248/56; 16/2.1
(58) Field of Search .......................... 174/65 G, 153 G, 174/152 G, 152 R, 135, 151; 248/56; 439/604; 16/2.1, 2.2

(56) References Cited

U.S. PATENT DOCUMENTS

| | | |
|---|---|---|
| 2,188,596 A | 1/1940 | Hobert |
| 2,225,472 A | 12/1940 | Franklin |
| 2,234,441 A | 3/1941 | Ludwig |
| 2,420,826 A | 5/1947 | Irrang |
| 2,489,715 A | 11/1949 | Mark, Jr. et al. |
| 2,800,526 A | 7/1957 | Moorhead |
| 2,922,836 A | 1/1960 | Brown |
| 3,182,119 A | 5/1965 | Millard |
| 3,182,120 A | 5/1965 | Duhn |
| 3,243,240 A | 3/1966 | Arthur |
| 3,245,428 A | 4/1966 | Klimak et al. |
| 3,654,382 A | 4/1972 | Rubright |
| 3,916,360 A | 10/1975 | Pedersen et al. |
| 4,033,535 A | 7/1977 | Moran |
| 4,630,806 A | 12/1986 | Dan et al. |
| 4,674,807 A | 6/1987 | Boteler et al. |
| 4,678,146 A * | 7/1987 | Plyler .......................... 248/56 |
| 4,864,080 A * | 9/1989 | Fochler et al. ............ 174/65 G |
| 4,959,509 A | 9/1990 | Takeuchi et al. |
| 5,071,143 A | 12/1991 | Byerly et al. |
| 5,806,139 A * | 9/1998 | Anderson et al. ............. 16/2.1 |
| 5,811,728 A | 9/1998 | Maeda |
| 5,836,048 A | 11/1998 | Rossman et al. |
| 6,119,305 A | 9/2000 | Loveall et al. |
| 6,218,625 B1 * | 4/2001 | Pulaski .................... 174/153 G |
| 6,359,224 B1 | 3/2002 | Beele |
| 6,495,755 B2 * | 12/2002 | Burton et al. ............. 174/65 G |
| 6,506,974 B2 * | 1/2003 | Nakata ...................... 174/65 G |
| 2002/0038492 A1 | 4/2002 | Hashimoto |
| 2002/0038715 A1 | 4/2002 | Nakata et al. |
| 2002/0040802 A1 | 4/2002 | Yasuda et al. |
| 2002/0056563 A1 | 5/2002 | Katayama |

FOREIGN PATENT DOCUMENTS

JP 408140246 5/1996

* cited by examiner

Primary Examiner—Dhiru R Patel
(74) Attorney, Agent, or Firm—Perkins Coie LLP

(57) ABSTRACT

The present invention provides a self-sealing grommet assembly. In one aspect of the invention, a grommet assembly is provided for use with an elongated member, such as a wire bundle, cable, or tube, that may have varying outer diameters. The grommet assembly has a flexible body portion with a radially inward-facing first sealing surface defining a central aperture sized to receive the elongated member. The flexible body portion has a radially outward-facing second sealing surface facing away from the first sealing surface. The body portion has an annular cavity formed therein substantially concentric with the central aperture and positioned between the first and second sealing surfaces. A biasing member is contained in the annular cavity and is configured to exert a radially inward sealing force to press the body portion into sealable engagement with the elongated member. In one aspect, a second biasing member is contained in the annular cavity and configured to exert a radially outward sealing force to press the body portion into sealable engagement with a structure, such as a wall, panel, or the like.

52 Claims, 4 Drawing Sheets

SELF-SEALING GROMMET ASSEMBLY

TECHNICAL FIELD

The present invention is directed to a grommet, and more particularly to a self-sealing grommet assembly.

BACKGROUND OF INVENTION

Flexible grommets are often used in an aircraft or the like to provide a seal between a hole in a wall panel and the outer diameter of a wire bundle, cable, or tube. Conventional grommets provide suitable performance characteristics when the wire bundles, cables, or tubes have consistent diameters within fairly tight tolerances. When a wire bundle, cable, or tube has an irregular diameter at various positions along its length, it is much more difficult to maintain the seal with a conventional grommet. Also, grommets can be worn out or eaten by fluids so as to degrade sufficient surface contact with the wire bundle, cable, or tube over the life of the grommet. It is highly desirable in many controlled environments to provide and maintain a seal with the grommet to prevent liquids, dust, debris, gasses, etc. from passing through the wall panel while still enabling the wire bundles, cables, or tubes to extend through the wall panel.

SUMMARY OF INVENTION

The present invention overcomes limitations of the prior art and provides additional benefits. A brief summary of some embodiments and aspects of the invention is presented. Thereafter, a detailed description of the illustrated embodiments is presented, which will permit one skilled in the relevant art to make and use aspects of the invention. One skilled in the art can obtain a full appreciation of aspects of the invention from the subsequent detailed description read together with the figures, and from the claims that follow the detailed description.

Under one aspect of the invention, a grommet assembly is provided that comprises a flexible body portion having a radially inward-facing first sealing surface defining a central aperture sized to receive an elongated member, such as a cable, wire bundle, tube, or the like. The flexible body portion has a radially outward-facing second sealing surface spaced apart from the first sealing surface, and an annular cavity is in the body portion between the first and second sealing surfaces. The annular cavity is substantially concentric with the central aperture. A biasing member is contained within the annular cavity and is configured to exert a radially inward sealing force that biases the body portion into a sealable engagement with the elongated member.

Under another aspect of the invention, the grommet assembly is adapted to fit into an aperture in a structure, such as a wall or panel through which the elongated member extends. The grommet assembly includes a second biasing member contained in the annular cavity and configured to exert a radially outward sealing force that biases the body portion into sealable engagement with the structure.

Under another aspect of the invention, a grommet assembly is made by the process including encasing a biasing member in a soluble core material to form a generally annular core. A flexible material is molded around the annular core to form a grommet. The grommet has a grommet body with a radially inward-facing first sealing surface defining a central aperture and a radially outward-facing second sealing surface generally concentric about the first sealing surface. The annular core is encased within the grommet body between the first and second sealing surfaces to form an annular cavity within the body portion. A flow of solvent is directed into the annular cavity, and the core material is dissolved within the annular cavity by the solvent. The solvent and the dissolved core material are removed from the cavity while the annular-shaped biasing member remains in the annular cavity. The biasing member is configured to exert a radially inward or outward sealing force that biases the body portion into sealable engagement with an elongated member or a structure.

DETAILED DESCRIPTION

A self-sealing grommet assembly and a corresponding method for making the grommet assembly in accordance with one or more embodiments of the present invention are described in detail herein. The following description sets forth numerous specific details, such as specific uses for the grommet assembly, specific materials usable for the assembly, and specific structures for use in manufacturing the assembly, to provide a thorough and enabling description for embodiments of the invention. One skilled in the relevant art, however, will recognize that the invention can be practiced without one or more of the specific details. In other instances, well-known structures or operations are not shown, or are not described in detail to avoid obscuring aspects of the invention.

Figure 1:
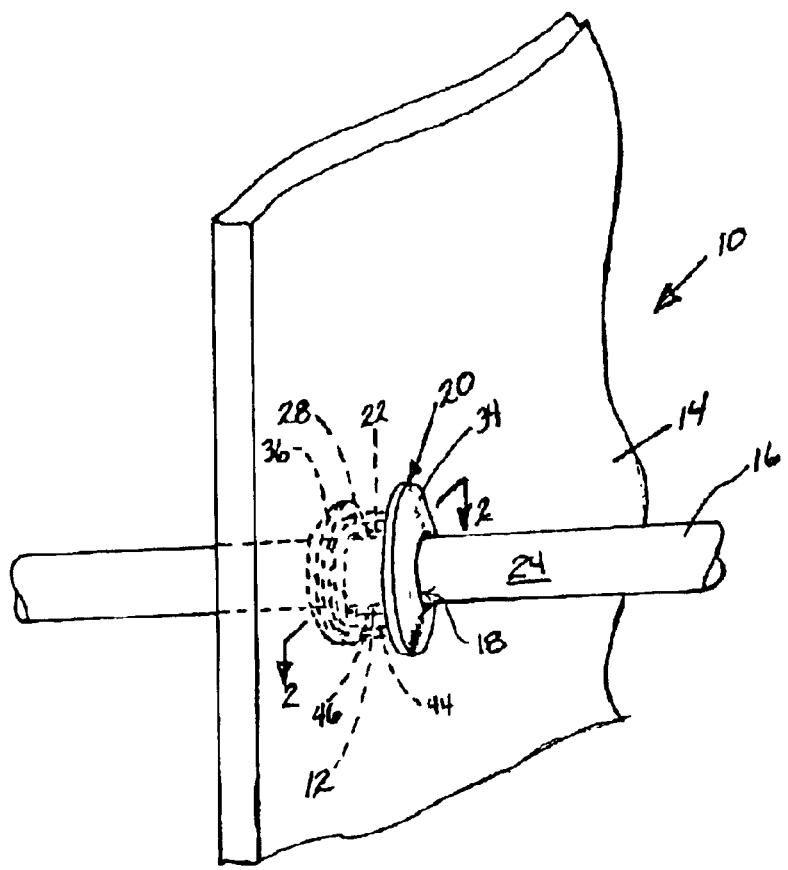
FIG. 1 is an isometric view of a self-sealing grommet assembly in a wall panel with an elongated member extending therethrough in accordance with one embodiment of the present invention.

FIG. 1 is an isometric view of a grommet assembly 10 in accordance with an embodiment of the present invention. FIG. 1 shows for illustrative purposes the grommet assembly 10 installed in an aperture 12 formed in a wall panel 14 or other selected structure. The grommet assembly 10 includes an annular body portion 20 having a central aperture 18, and an elongated member, shown as a wire bundle 16, extends axially through the central aperture. As discussed in greater detail below, the grommet assembly 10 is a self-sealing assembly that sealably engages the wire bundle 16 and the wall panel 14 around the aperture 12.

Figure 2:
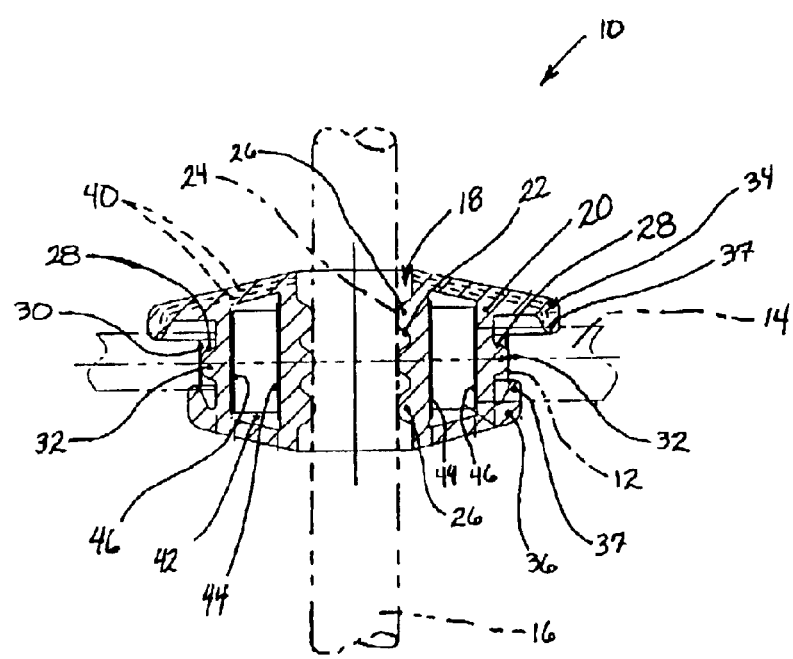
FIG. 2 is an enlarged cross-sectional view taken substantially along line 2—2 of FIG. 1.

FIG. 2 is an enlarged cross-sectional view of the grommet assembly 10 of FIG. 1. The body portion 20 of the grommet assembly 10 has a radially inward-facing sealing surface 22 that defines the central aperture 18 and that sealably engages the outer surface 24 of the wire bundle 16. In the illustrated embodiment, the grommet body 20 is a flexible body that includes a plurality of flexible sealing ribs 26 that define part of the inner sealing surface 22. The sealing ribs 26 are shaped and sized to compress against the outer surface 24 of the wire bundle 16 so as to form a substantially fluid tight seal that prevents the passage of fluids, dust, debris, or gases through the central aperture 18 between the wire bundle 16 and the grommet body 20. In the illustrated embodiment, the grommet body 20 is made of a flexible elastomeric material such that the sealing ribs 26 can be compressed and deflected so as to form the seal around the wire bundle 16 having an irregular diameter shape or size at the point extending through the grommet's central aperture 18.

The grommet body 20 also has a radially outward-facing annular sealing surface 28 that faces away from the inner sealing surface 22. The grommet body 20 is shaped and sized to fit into the aperture 12 in the wall panel 14 with the outer sealing surface facing the annular aperture surface 30 of the wall panel 14 that defines the aperture 12. In the illustrated embodiment, the outer sealing surface 28 sealably engages the aperture surface 30. The grommet body 20 of the illustrated embodiment includes an outer sealing rib 32 projecting radially outward along part of the outer sealing surface 28 so as to press against and sealably engage the wall panel's aperture surface 30 when the grommet body 20 is positioned in the aperture 12.

The flexible rubber grommet body 20 includes an annular front flange 34 spaced apart from an annular rear flange 36. Each of the front and rear flanges 34 and 36 projects from the outer sealing surface 28 and is shaped to engage opposite sides of the wall panel 14 around the aperture 12. The front and rear flanges 34 and 36 include an inward-facing annular ridge 37 configured to sealably engage the wall panel 14 around the aperture 12. The ridges 37 on the front and rear flanges 34 and 36 provide additional sealing on panels 14 of varying thickness. The grommet assembly 10 of the illustrated embodiment is configured and sized so the annular ridges 37 can sealably engage a wall panel 14 having a thickness in the range of approximately 0.04 inches to 0.25 inches or greater. The seals formed between the grommet body 20 and the wall panel 14, including at the interface with the annular ridges 37, are designed to prevent the migration of fluid, dust, debris, or gas between the wall panel and the grommet body. In the illustrated embodiment, the front flange 34 is radially longer than the rear flange 36. Accordingly, the grommet body 20 can be installed through the wall panel's aperture 12 by pressing the rear flange 36 through one side of the aperture until the rear flange projects through the aperture's opposite side. The outer sealing surface 28 and the outer sealing rib 32 then engage the wall panel's aperture surface 30, and the front flange 34 is pulled into engagement with the wall panel 14 around the aperture 12.

In the illustrated embodiment, the grommet body 20 is made from a flexible, elastomeric material, such as silicone or other moldable rubber material. In one embodiment, the flexible grommet body 20 is made of a material that contains fire retardants to provide a selected fire resistance or fireproofing of the grommet assembly 10. When fire protection is not required but high temperature protection is required, high temperature silicones could be used. When the grommet assembly requires protection from caustic or fuel environments, such as jet fuel, Fluoro Silicone could be used. When other environmental protections are required, elastomers such as Neoprene rubber, Buna N or Nitrile Butadiene rubbers, or Ethylene Propylene rubbers could also be used.

The grommet body 20 in the illustrated embodiment of FIG. 2 also has a plurality of fireproofing layers 40 made of ceramic or glass fibers molded into the front flange 34. In the illustrated embodiment, two fireproofing layers 40 are shown, although other numbers of layers can be used in the grommet body. The fireproofing layers 40 as shown are integrally molded into the front side of grommet body 20, although fireproofing layers in the alternate embodiments can be integrally molded into the grommet body's rear side (not shown) and along the rear flange 36, while maintaining the flexibility of the grommet body.

As best seen in FIG. 2, the grommet body 20 includes an annular cavity 42 integrally formed therein between the inner and the outer sealing surfaces 22 and 28 and concentrically arranged around the central aperture 18. An inner biasing member 44 is fully contained in and extends around the annular cavity 42. The inner biasing member 44 is configured so that it can float laterally a selected short distance within the annular cavity 42 to position itself in a sealing position relative to the grommet body 20 and relative to the wire bundle 16. In one embodiment, the inner biasing member 44 is an annular-shaped, metal flat spring, although other biasing members can be used. The inner biasing member 44 is a separate member configured to exert a radially inward contracting force on the flexible grommet body 20 so as to push the inner sealing surface 22 and the sealing ribs 26 into constant contact and firm, sealable engagement with the wire bundle 16. Accordingly, if the wire bundle 16 has a varying outer diameter or shape, the inner biasing member 44 pushes the grommet body's inner sealing surface 22 into engagement with the wire bundle and maintains the seal along the wire bundle's outer surface 24. The inner biasing member 44 is flexible enough so that the grommet assembly 10 can be installed on the wire bundle 16 having a range of diameters and shapes while being able to self-seal the grommet assembly 10 onto the cable assembly.

The grommet assembly 10 of the illustrated embodiment also has an outer biasing member 46 fully contained in the annular cavity 42 and concentrically arranged around the inner biasing member 44 and the central aperture 18. The outer biasing member 46 is configured to float laterally within the annular cavity 42 a selected short distance to position itself in a sealing position relative to the grommet body 20 and relative to the aperture 12 in the wall panel 14. Similar to the inner biasing member 44, the inner and outer biasing members 44 and 46 can be made of beryllium copper (Be—Cu), steel, Stainless Steel, Inconel, or other suitable metal or material. The outer biasing member 46 in one embodiment is a flat metal spring, although other biasing members can be used. The outer biasing member 46 provides a radially outward expansion force against the grommet body 20. Accordingly, the outer biasing member 46 pushes the outer sealing surface 28 and outer sealing rib 32 into sealable engagement with the aperture surface 30 in the wall panel 14, thereby maintaining constant contact and a seal between the grommet body 20 and the wall panel. The outer biasing member 46 also positions the grommet body 20 so that the front and rear flanges 34 and 36, respectively, remain in engagement with the wall panel 14 adjacent to the aperture 12.

In compressive environments such as is experienced by the grommet assembly 10, the rubber material may take compression set over time. The compression set is a loss of the original thickness of the rubber walls. The inner and outer biasing members 44 and 46 help maintain the seal between the grommet body 20 and the wall panel 14 and the wire bundle 16. The use of both of the inner and outer biasing members 44 and 46 simultaneously apply constant pressure and a constant seal around the grommet body 20 and the wire bundle even if the rubber grommet body undergoes compression set over time.

Figure 3:
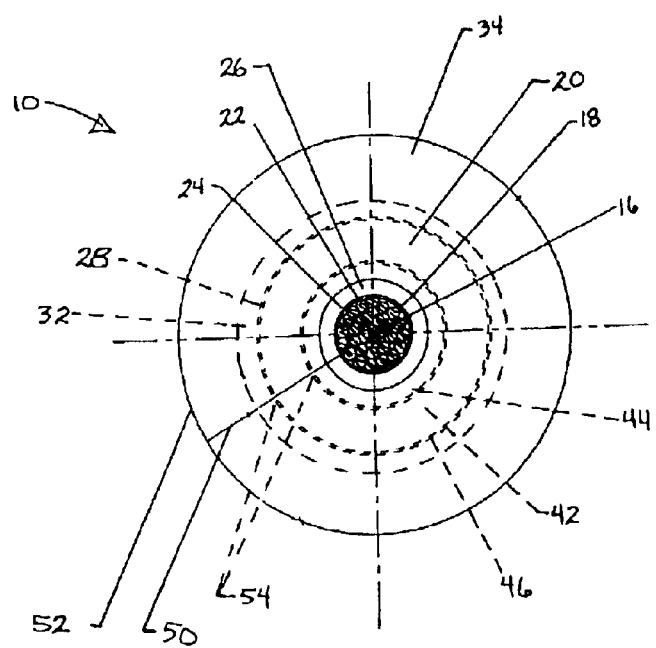
FIG. 3 is an enlarged front elevation view of the grommet assembly of FIG. 2 shown removed from the wall panel.

FIG. 3 is a front elevation view of the grommet assembly 10 of FIG. 2 shown removed from the wall panel. In the illustrated embodiment, the grommet body 20 of the grommet assembly 10 has a radial split 50 therethrough extending from the central aperture 18 to the outer edge portion 52 of the grommet body. The inner and outer biasing members 44 and 46 have a brake 54 therein corresponding to and aligning with the radial split 50. Accordingly, the grommet body 20 and the inner and outer biasing members 44 and 46 can be temporarily separated along the radial split 50 and installed onto the wire bundle 16 without having to axially thread the wire bundle along its length through the central aperture 18 of the grommet body 20. In one embodiment, after the grommet assembly 10 has been installed on the wire bundle through the radial split 50, the radial split can be closed with a suitable conventional adhesive, including an elastomeric fire-retardant adhesive. In an alternate embodiment, the grommet body 20 is fully intact without the radial split 50, such that the grommet assembly 10 is installed onto a wire bundle 16 by threading the wire bundle axially through the central aperture 18 of the grommet body 20.

In one embodiment of the present invention, the grommet assembly 10 is manufactured using a "lost-salt" molding technique. The inner and outer biasing members 44 and 46 are molded into and encased within a compressed, annular-shaped salt core. The salt core has a shape corresponding to the desired internal annular cavity 42 of the grommet assembly 10 shown in FIG. 2. The compressed salt core is positioned in a mold shaped for the specific grommet assembly 10, and silicone rubber is placed into the mold. The silicone rubber is molded around the salt core containing the inner and outer biasing members 44 and 46. In one embodiment, the ceramic or glass fiber fireproofing layers 40 are also molded into the grommet body 20 during the molding process. The molded grommet body 20 containing the salt core is removed from the mold and cured using conventional curing techniques while the salt core and the inner and outer biasing members 44 and 46 are still encapsulated within the grommet body 20.

In one embodiment, the grommet body 20 is molded to form inlet and outlet channels through the grommet body to the salt core. A flow of solvent, such as water or the like, is directed into the annular cavity 42 through the inlet channel and into contact with the salt core. The water dissolves the salt, and the dissolved salt and water are flushed out of the annular cavity 42 through the outlet channel. The flow of water through the inlet and outlet channels is continued until substantially all the salt from the salt core has been removed from the annular cavity 42. While the described embodiment uses salt to form the annular core, other soluble materials can be used that will dissolve upon contact with a selected solvent. After the salt core is dissolved and removed from the annular cavity 42, the inner and outer biasing members 44 and 46 are left behind, fully contained in the annular cavity so that the inner biasing member will exert the radially inward force against the flexible rubber grommet body 20 and the outer biasing member will exert the radially outward sealing force against the grommet body.

In one embodiment, the grommet assembly 10 is cut after being molded so as to form the radial split 50, as discussed above with respect to FIG. 3. In another embodiment, the grommet body 20 is molded to have the radial split 50 integrally formed therein during the molding process. The radial split is formed so that it is properly aligned with the breaks in the inner and outer biasing members 44 and 46. In this alternate embodiment, the solvent can be pumped into the annular cavity 42 via access through the radial split 50 so as to dissolve the salt or other selected soluble material that forms the core used during the molding process.

Figure 4:
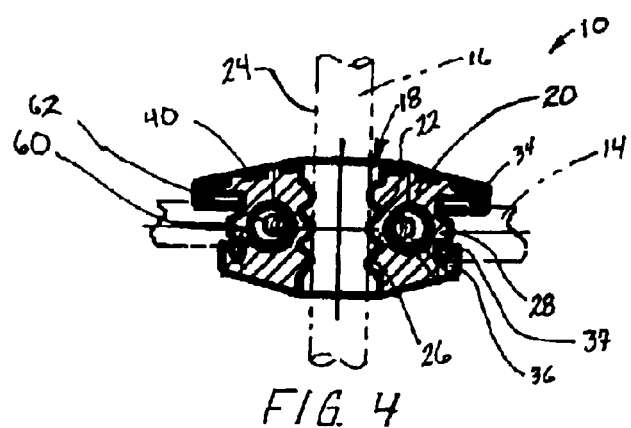
FIG. 4 is a cross-sectional view of a grommet assembly in accordance with an alternate embodiment of the present invention.

FIG. 4 is a cross-sectional view of a grommet assembly 10 in accordance with an alternate embodiment. The grommet assembly 10 in this embodiment is configured such that the grommet body 20 contains an annular cavity 60 having a generally circular cross-sectional shape. A single inner biasing member 62 is provided in the annular cavity 60 to exert the radially inward force to sealably engage the inner sealing surface with the wire bundle 16. In this illustrated embodiment, the inner biasing member 62 is a coil spring having a generally circular cross-sectional shape and sized to provide the sealable engagement between the grommet body 20 and the irregular outer surface of the wire bundle. The grommet body 20 maintains the seal with the wall panel 14 with outer sealing rib 32 and the annular ridges 37 on the front and rear flanges 34 and 36. In another alternate embodiment, the grommet assembly 10 is configured so that the grommet body 20 contains only the outer biasing member 46 within the annular cavity 42.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. Teachings of the invention provided herein could be applied to other grommet components with various shapes, not necessarily the specific component described above.

While certain aspects of the invention are presented below in certain claim forms, the inventor contemplates the various aspects of the invention in any number of claim forms. In general, in the following claims, the terms used should not be construed to limit the invention to the specification embodiments disclosed in the specification and claims, but should be construed to include all components and methods of manufacturing the components in accordance with the claims. Accordingly, the invention is not limited by the disclosure, but instead the scope of the invention is to be determined entirely by the claims.

What is claimed is:

1. A grommet assembly for use with an elongated member, comprising:

a flexible body portion having a radially inward-facing first sealing surface defining a central aperture sized to receive the elongated member, the flexible body portion having a radially outward-facing second sealing surface, the body portion having an annular cavity formed therein substantially concentric with the central aperture and between the first and second sealing surfaces; and a biasing member contained in the annular cavity and being configured to exert a radially inward sealing force and partially contract the body portion to press the body portion into sealable engagement with the elongated member 1.

2. The grommet assembly of claim 1 wherein the biasing member is a first biasing member, and further comprising a second biasing member in the annular cavity and concentrically arranged with the central aperture, the second biasing member being biased radially outward.

3. The grommet assembly of claim 1 wherein the body portion further includes a plurality of fire-resistant layers molded into the body portion.

4. The grommet assembly of claim 1 wherein the body portion is a rubber material containing fire retardants.

5. The grommet assembly of claim 1 wherein the body portion includes a plurality of sealing projections extending radially inwardly into the central aperture and configured to sealably engage the elongated member.

6. The grommet assembly of claim 1 wherein the body portion includes an access portion that provides access to the annular cavity.

7. The grommet assembly of claim 1 wherein the annular cavity is substantially fully sealed with the biasing member contained in the annular cavity.

8. The grommet assembly of claim 1 wherein the biasing member is an annular spring.

9. The grommet assembly of claim 1 wherein the biasing member is a flat metal spring.

10. A grommet assembly for use with an elongated member extending through an aperture in a structure, comprising:
   a flexible body portion having a radially inward-facing first sealing surface defining a central aperture sized to receive the elongated member, the flexible body portion having a radially outward-facing second sealing surface sized to fit in the aperture in the structure, the body portion having an annular cavity formed therein substantially concentric with the central aperture and between the first and second sealing surfaces; and
   a biasing member contained in the annular cavity and being configured to exert a radially outward sealing force and press the body portion into sealable engagement with the structure.

11. The grommet assembly of claim 10 wherein the body portion includes a pair of spaced-apart opposing engagement flanges extending radially away from the second sealing surface and sized to engage the structure around the aperture, each of the engagement flanges have an engagement rib extending toward each other.

12. The grommet assembly of claim 10 wherein the body portion includes a plurality of sealing projections extending radially outwardly between the engagement flanges into the central aperture and configured to sealably engage the structure adjacent to the aperture.

13. The grommet assembly of claim 10 wherein the body portion further includes a plurality of fire-resistant layers molded into one side of the body portion.

14. The grommet assembly of claim 10 wherein the body portion is a rubber material containing fire retardants.

15. The grommet assembly of claim 10 wherein the body portion includes a plurality of sealing projections extending radially inwardly into the central aperture and configured to sealably engage the elongated member.

16. The grommet assembly of claim 10 wherein the body portion includes an access portion that provides access to the annular cavity.

17. The grommet assembly of claim 10 wherein the annular cavity is substantially fully sealed with the biasing member contained in the annular cavity.

18. The grommet assembly of claim 10 wherein the biasing member is an annular spring.

19. A grommet assembly for use with an elongated member extending through an aperture in a structure, comprising:
   a flexible body portion having a radially inward-facing first sealing surface defining a central aperture sized to receive the elongated member the body portion having a radially outward-facing second sealing surface sized to fit in the aperture in the structure, and a pair of spaced-apart opposing engagement flanges extending radially away from the second sealing surface and sized to engage the structure around the aperture, the body portion having an internal annular cavity formed therein concentric with the central aperture and between the first and second sealing surfaces;
   a first biasing member in the annular cavity and concentrically arranged with the central aperture, the first biasing member being biased radially inwardly and sized to exert a radially inward force on the body portion to press the body portion into sealable engagement with the elongated member; and
   a second biasing member in the annular cavity and concentrically arranged with the central aperture, the second biasing member being biased radially and sized to exert a radially outward force on the body portion to press the body portion into sealable engagement with the selected structure.

20. The grommet assembly of claim 19, further comprising a plurality of fire-resistant layers molded into the body portion.

21. The grommet assembly of claim 19 wherein the body portion is a rubber material containing fire retardants.

22. The grommet assembly of claim 19 wherein the body portion includes a plurality of sealing projections extending radially inwardly into the central aperture and configured to sealably engage the elongated member.

23. The grommet assembly of claim 19 wherein the body portion includes a plurality of sealing projections extending radially outwardly between the engagement flanges into the central aperture and configured to sealably engage the structure.

24. The grommet assembly of claim 19 wherein the body portion includes an access portion that provides access to the annular cavity.

25. The grommet assembly of claim 19 wherein the body portion has a radial split therein extending from the central aperture to one of the engagement flanges.

26. The grommet assembly of claim 19 wherein the annular cavity is substantially fully sealed with the first and second spring members contained in the annular cavity.

27. The grommet assembly of claim 19 wherein the first and second springs are metal springs.

28. An installation assembly, comprising:
   a structure having an aperture therethrough;
   an elongated member extending axially through the aperture; and
   a grommet assembly positioned in the aperture around the elongated aperture, the grommet assembly comprising:
      a flexible body portion having a radially inward-facing first sealing surface defining a central aperture sized to receive the elongated member, the flexible body portion having a radially outward-facing second sealing surface facing the structure around the aperture, the body portion having an annular cavity formed therein substantially concentric with the central aperture and between the first and second sealing surfaces; and
      a biasing member contained in the annular cavity and being configured to exert a radially inward sealing force and partially contract the body portion to press the body portion into sealable engagement with the elongated member.

29. The assembly of claim 28 wherein the biasing member is a first biasing member, and further comprising a second biasing member in the annular cavity and concentrically arranged with the central aperture, the second biasing member being biased radially outwardly and sized to press the body portion into sealable engagement with the structure around the aperture.

30. The assembly of claim 28 wherein the elongated member is a wire bundle.

31. The assembly of claim 28 wherein the structure is a wall panel.

32. The assembly of claim 28 wherein the body portion further includes a plurality of fire-resistant layers molded into one side of the body portion.

33. The assembly of claim 28 wherein the body portion is a rubber material containing fire retardants.

34. The assembly of claim 28 wherein the body portion includes a plurality of sealing projections extending radially inwardly into the central aperture and configured to sealably engage the elongated member.

35. The assembly of claim 28 wherein the annular cavity is substantially fully sealed with the biasing member contained in the annular cavity.

36. The assembly of claim 28 wherein the biasing member is an annular flat spring.

37. The assembly of claim 28 wherein the body portion includes a plurality of sealing projections extending radially outwardly between the engagement flanges into the central aperture and configured to sealably engage the structure around the aperture.

38. The grommet assembly of claim 28 wherein the body portion further includes a plurality of fire-resistant layers molded into one side of the body portion.

39. A grommet assembly made by the process, comprising:

providing an annular-shaped biasing member;

encasing the biasing member in a soluble core material to form generally annular core;

molding a flexible material around the annular core to form a grommet having a grommet body having a radially inward facing first sealing surface defining a central aperture, the flexible body portion having a radially outward facing second sealing surface generally concentric about the first sealing surface, the annular core being encased in the grommet body between the first and second sealing surfaces to form an annular cavity within the body portion;

directing a flow of solvent into the annular cavity;

dissolving the core material within the annular cavity with the solvent flowing into the cavity; and removing the solvent and the dissolved core material from the cavity with the annular-shaped biasing member remaining in the annular cavity, the biasing member being configured to exert a radially inward sealing force and partially contract the body portion about the central aperture.

40. The grommet assembly of claim 39 wherein encasing the biasing member in a soluble core material includes encasing the biasing member in a salt core.

41. The grommet assembly of claim 39 wherein directing a flow of solvent includes directing a flow of water into the annular cavity.

42. The grommet assembly of claim 39 wherein the biasing member is a first biasing member, and the process further comprising providing a second biasing member, and encasing the biasing member includes encasing the first and second biasing members in a soluble core material to form generally annular core.

43. The grommet assembly of claim 39 wherein molding a flexible material includes molding a fire-resistant, rubber-based material around the annular core.

44. The grommet assembly of claim 39 wherein directing a flow of solvent into the annular cavity includes directing a flow of solvent into the cavity through an access hole formed in the grommet body, and removing the solvent and the dissolved core material from the cavity includes draining the solvent and dissolved core material through a drain hole formed in the grommet body.

45. The grommet assembly of claim 39, further comprising molding a fire-resistant fabric layer into the rubber grommet body.

46. A method of making a self-sealing grommet assembly, comprising:

providing an annular-shaped biasing member;

encasing the biasing member in a soluble core material to form generally annular core;

molding a flexible material around the annular core to form a grommet having a grommet body having a radially inward facing first sealing surface defining a central aperture, the flexible body portion having a radially outward facing second sealing surface generally concentric about the first sealing surface, the annular core being encased in the grommet body between the first and second sealing surfaces to form an annular cavity within the body portion;

directing a flow of solvent into the annular cavity;

dissolving the core material within the annular cavity with the solvent flowing into the cavity; and removing the solvent and the dissolved core material from the cavity with the annular-shaped biasing member remaining in the annular cavity, the biasing member being configured to exert a radially inward sealing force and partially contract the body portion about the central aperture.

47. The method of claim 46 wherein encasing the biasing member in a soluble core material includes encasing the biasing member in a salt core.

48. The method of claim 46 wherein directing a flow of solvent includes directing a flow of water into the annular cavity.

49. The method of claim 46 wherein the biasing member is a first biasing member, and the process further comprising providing a second biasing member, and encasing the biasing member includes encasing the first and second biasing members in a soluble core material to form generally annular core.

50. The method of claim 46 wherein molding a flexible material includes molding a fire-resistant, rubber-based material around the annular core.

51. The method of claim 46 wherein directing a flow of solvent into the annular cavity includes directing a flow of solvent into the cavity through an access hole formed in the grommet body, and removing the solvent and the dissolved core material from the cavity includes draining the solvent and dissolved core material through a drain hole formed in the grommet body.

52. The method of claim 46, further comprising molding a fire-resistant fabric layer into the rubber grommet body.

* * * * *

UNITED STATES PATENT AND TRADEMARK OFFICE
CERTIFICATE OF CORRECTION

PATENT NO. : 6,768,058 B2
DATED : July 27, 2004
INVENTOR(S) : Hari S. Pallapothu It is certified that error appears in the above-identified patent and that said Letters Patent is hereby corrected as shown below:

<u>Title page,</u>
Item [56], References Cited, U.S. PATENT DOCUMENTS, "2,420,826   5/1947   Irrang" should be -- 2,420,826   5/1947   Irrgang --;

Signed and Sealed this

Nineteenth Day of April, 2005

JON W. DUDAS
*Director of the United States Patent and Trademark Office*